United States Patent
Frazier et al.

(10) Patent No.: US 6,982,814 B1
(45) Date of Patent: Jan. 3, 2006

(54) IMAGE PRINTING DEVICES WITH AM/FM HALF-TONING WITH SELF-DETERMINATION OF DOT SIZE AND METHOD OF IMPLEMENTING SAME

(75) Inventors: Allen L. Frazier, Eagle, ID (US); Jan P. Allebach, W. Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 09/648,531

(22) Filed: Aug. 23, 2000

(51) Int. Cl.
*H04N 1/40* (2006.01)
*B41J 2/47* (2006.01)

(52) U.S. Cl. .................................. 358/3.12; 358/3.02
(58) Field of Classification Search ................ 358/1.9, 358/1.15, 3.02, 1.7, 3.06–3.12; 382/237
See application file for complete search history.

(56) References Cited

U.S. PATENT DOCUMENTS

| 4,746,935 | A |   | 5/1988  | Allen ........................ 346/140 |
| 4,985,779 | A | * | 1/1991  | Gall ........................... 358/3.1 |
| 5,025,325 | A |   | 6/1991  | Hudson ....................... 358/447 |
| 5,111,302 | A |   | 5/1992  | Chan et al. .................. 358/298 |
| 5,402,245 | A |   | 3/1995  | Motta et al. ................. 358/298 |
| 5,818,504 | A |   | 10/1998 | Chung et al. ................ 347/251 |
| 5,835,123 | A |   | 11/1998 | Chung et al. ................ 347/251 |
| 5,854,886 | A |   | 12/1998 | MacMillan et al. .......... 395/114 |
| 5,923,349 | A |   | 7/1999  | Meyer .......................... 347/43 |
| 5,929,892 | A |   | 7/1999  | Towner et al. ............... 347/255 |
| 5,990,923 | A |   | 11/1999 | Morrison ..................... 347/252 |
| 6,014,161 | A |   | 1/2000  | Hirst et al. .................. 347/252 |
| 6,034,711 | A |   | 3/2000  | Trask et al. .................. 347/240 |
| 6,040,927 | A |   | 3/2000  | Winter et al. ................ 358/534 |
| 6,170,930 | B1 | * | 1/2001  | Wallace ......................... 347/15 |

* cited by examiner

*Primary Examiner*—Thomas D. Lee
*Assistant Examiner*—Stephen Brinich (57) ABSTRACT

The data required to specify an image which is to be printed by a printing device, such as an ink-jet or laser printer, can be substantially reduced by omitting the data specifying the dot size or amplitude modulation (AM). Instead, the processor of the printing device determines the dot density in the immediate vicinity of each dot and, from that density measurement, calculates the appropriate dot size and modulates the dot size accordingly when driving the print head or print laser.

31 Claims, 10 Drawing Sheets

IMAGE PRINTING DEVICES WITH AM/FM HALF-TONING WITH SELF-DETERMINATION OF DOT SIZE AND METHOD OF IMPLEMENTING SAME

CROSS REFERENCE TO RELATED APPLICATION

This application is related to Application Ser. No. 09/645,790, which is incorporated herein by reference in its entirety.

FIELD OF THE INVENTION

The present invention relates to the field of printers (both inkjet and laser printers) as well as to facsimile machines, copiers and other image printing devices that print images that use a large number of tiny dots to build the desired image. More specifically, the present invention relates to an improved method and apparatus for generating half-tones within such images printed by such image printing devices to result in higher quality images.

BACKGROUND OF THE INVENTION

In simplest form, ink jet image printing devices which print a large number of small dots to create the desired image operate by moving a print head linearly back and forth across a print medium, for example, a sheet of paper, and printing dots with that print head according to an image data stream. The dots are printed in a densely packed pattern that, when viewed by human eyes, appears as the image represented by the image data stream. This image can be alpha-numeric text, a picture or graphic, or a combination of the two. Similarly, in a laser printing device, the laser is scanned linearly back and forth across a print drum to create areas or pixels ("dots") to which toner will adhere when applied, thus creating the image specified by the image data stream.

In order to provide a high quality image, a continuum of shades between black and white, or between extreme shades of each color, must be available so as to be rendered by the printing device. These shades between the extremes are known as halftones or gray-scale levels. A half-tone may be specified by absorptance. "Absorptance" refers to the fraction of photons absorbed by a dot or portion of the printed image. The higher the fraction of absorbed photons, as distinguished from reflected photons, the darker that portion of the printed image appears. Consequently, within the image printed by the printing device there must be a method of making the printed dots generate gradations or halftones to create a high-quality image.

Half-toning can be accomplished by a number of methods that involve modulating the characteristics of the dots printed. There are two main dot characteristics that can be varied to effect the half-tone or gray-scale of a portion of an image printed. These characteristics are the size of the dots and the density of the dots. Both of these characteristics can be modulated simultaneously to control how light or dark, in a gray or color scale, a particular section of the printed image appears. With printers that are stable and have less dot gain, the advantage of dot size modulation is most significant in highlights where smaller dots produce less visible highlight textures. With printers that are less stable and/or have more dot gain, using larger dots in the mid-tones may also result in improved quality.

In many printing devices, a relatively large amount of data is required at all stages of data processing to communicate an image to be printed. Consequently, there is a present need in the art for a method and device that can, at least at some phase of the data processing, decrease the amount of data that must be stored and transmitted to represent the image being printed without sacrificing the quality of the image.

SUMMARY OF THE INVENTION

Accordingly, the present invention is directed to a method and device that helps decrease the amount of data required to describe the image being printed at a particular phase of image data processing so as to facilitate transmission or storage of that data without sacrificing the quality of the image as printed by an image printing device receiving that data signal. The present invention may be embodied in an image printing device having an input for receiving an image data signal in the image printing device and a processor in the image printing device for receiving and processing the image data signal. The image data signal contains data specifying location data for each dot of which an image described by the image data signal is constituted. The processor determines the appropriate size for each dot based on dot density data derived from the location data of the image data signal.

The processor is programmed to count the number of dots specified by the location data for printing in a square matrix centered on a particular dot for which dot size is to be determined. The processor then calculates a dot density estimation based on the number of dots in the square matrix. From this density estimation, dot size can be calculated as a function of density and absorptance. Consequently, less data need by carried by the image data signal to define the image to be printed.

The image printing device can then print the image using the location data in the image data signal and dot size data determined by the processor. The time required to transmit the image to the printing device is decreased, as is the space required to store the image data signal.

The principles of the present invention may be incorporated in a laser printer, an ink-jet printer, a fax or copy machine or any other image printing device that receives an image data signal from which the printed image is derived.

The present invention also encompasses the method of printing an image with an image printing device based on an image data signal that comprises data specifying print location data for each dot that constitutes the image without the need to specify the size of each such dot. This method includes determining the proper size for each dot based on dot density data derived from the print location data of the image data signal.

DETAILED DESCRIPTION OF THE INVENTION

As will be explained below, both dot size and dot density can be modulated simultaneously to achieve a desired half-toning effect. In AM/FM half-toning, the size and density of the dots are modulated to achieve the desired intensity, or gray-scale, for each portion of the image being printed. Modulating dot size is sometimes referred to as amplitude modulation ("AM") since the amplitude or size of the dot controls the intensity or gray level while modulating dot density is sometimes referred to as frequency modulation ("FM") since the frequency or spacing of the dots controls the intensity or gray level.

In providing a basic explanation of AM/FM half-toning, we assume an ideal dot-matrix image printing device with a print head that can mark the print medium, i.e., make a "dot," with perfectly square dots that have a perfect absorptance of one (1) (i.e., 100%) within the pixel and an absorptance of zero (0) (i.e., 0%) outside the pixel. In other words, all the ink or toner the print head is capable of depositing at a particular dot location is perfectly deposited and retained within a square dot and does not stray or bleed outside the intended dimensions of the printed dot.

As noted above, "absorptance" is a measure of how dark or intense portions of the printed image are. As defined, absorptance (b) will always be a ratio value between 0 and 1, i.e. 0<b<1. In our hypothetical, ideal system, an absorptance of 0 is a perfectly white portion or pixel, and an absorptance of 1 is a perfectly dark intense image portion or pixel.

Consequently, to keep absorptance (b) constant, the dot pattern (i.e., texture) must have an appropriate combination of density (D) and dot size ($\theta$). As noted above, absorptance, density and dot size are all related quantities, with dot size and density being variable to achieve a desired absorptance value.

Density (D) is defined as the area covered by printed dots as divided by a unit area containing those dots. Density is consequently always between 0 and 1, and may be expressed in terms of D=b dots/pixel.

When dot size is varied, it is "modulated" based on a standard dot size. We define a ratio, theta ($\theta$), which is the modulated dot size divided by the size of a standard, unmodulated dot. For example, if $\theta$<1, the modulated dot is smaller than the unmodulated standard dot. Conversely if $\theta$>1, the modulated dot is larger than the standard dot.

We now consider the example of a highlight area of the image being printed, where the dots are far enough apart to avoid overlap and it is desired to keep absorptance (b) constant at some pre-determined value between 0 and 1. If $\theta$<1, and the modulated dot is smaller than a standard, unmodulated dot, density (D) must be increased to maintain a desired constant absorptance for the pixel. Conversely if $\theta$>1, and the modulated dot is larger than the standard dot, density (D) must be decreased to maintain the desired constant absorptance.

In our ideal system, density (D) must satisfy D=b/$\theta$. Thus, to achieve any given or desired absorptance (b), density and dot size are chosen to satisfy the equation b=D$\theta$ for the given absorptance (b). However, this relationship is only strictly true in highlight areas of an image printed with the ideal image printing device assumed above.

In practice, image printing devices are calibrated as follows. Dot size, as represented by the ratio $\theta$, is fixed. The image printing device is then used to print a step wedge, or image pattern, consisting of patches of constant density. The density is varied from patch to patch ranging from 0 to 1 in steps of 1/256, i.e., 256 separate constant-density patches are printed each at a different density, the densities ranging in equal steps from 0 to 1.

The printed page is then optically scanned. For each constant density patch, an average absorptance is computed as well as a measure of the visual noise (N) occurring in the printed image.

This process is repeated for a range of dot sizes, i.e., $\theta$ values between 0 and 1. For each absorptance value, a selection is made between the various combinations of density (D) and dot size ($\theta$) which resulted in a particular absorptance. The combination selected is that with the lowest measured noise factor (N).

However, it is also necessary to constrain the dot size ($\theta$) and density (D) to vary smoothly from gray level to gray level. Otherwise, the resulting half-tones may appear grainy in smooth, non-varying areas that contain some noise, and may exhibit contouring artifacts in slowly varying areas such as gradients. To provide smooth variation in the dot size ($\theta$) and density (D) giving rise to particular absorptances (b), the combinations of dot size ($\theta$) and density (D) are jointly chosen for all gray levels to minimize a cost function which consists of the sum of the noise factors (N) for each gray level plus a term that penalizes the amount of change in the variables for dot size ($\theta$) and density (D) from level to level across the tone or gray scale.

Figure 1:
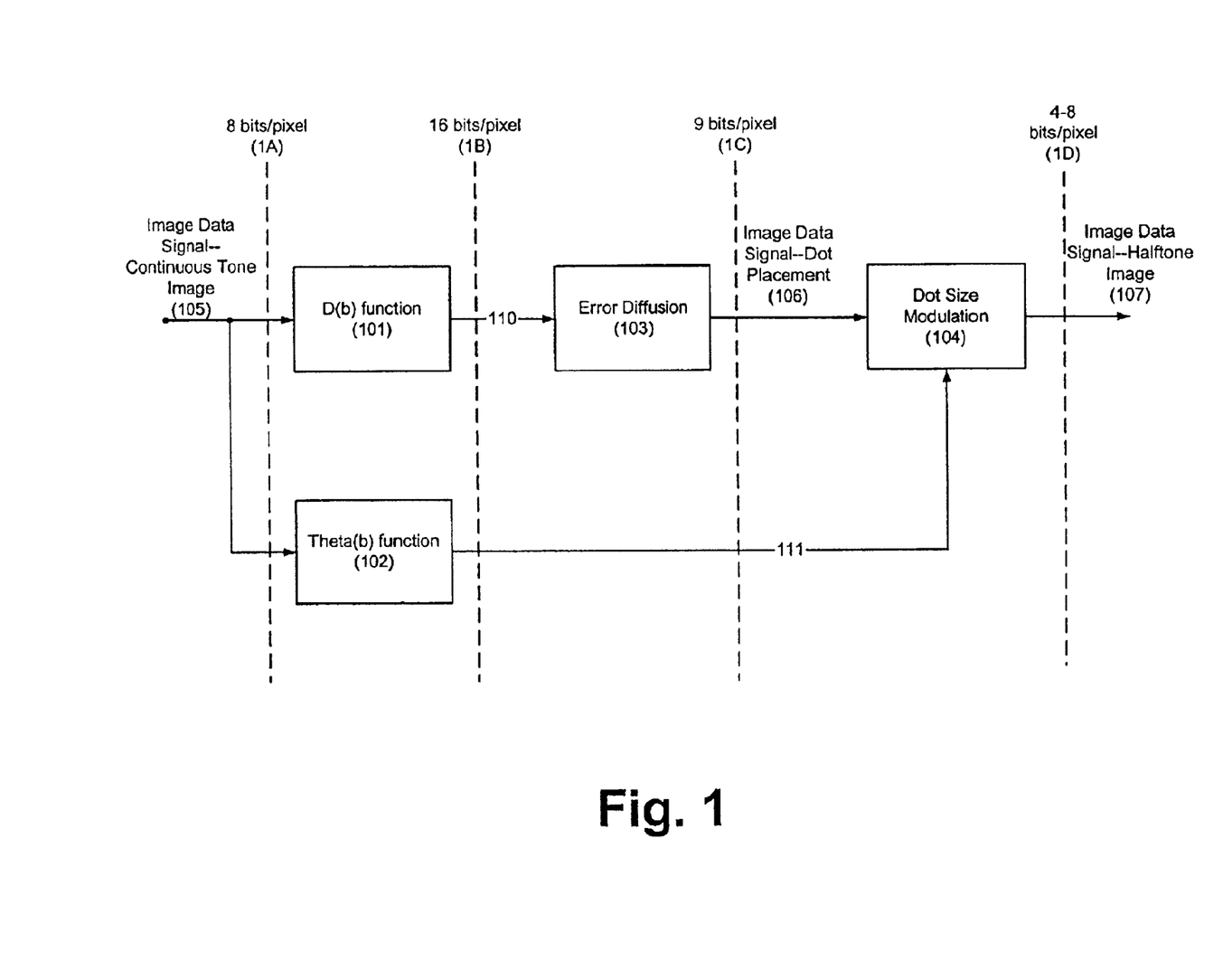
FIG. 1 is a functional block diagram illustrating basic processing of a continuous tone image signal in an image printing device.

From these computations, we derive two tables. The first gives an appropriate density (D) for each input absorptance (b). The second gives an appropriate dot size ($\theta$) for each input absorptance (b). Usually, these values are tabulated from 256 levels of absorptance uniformly spaced between 0 and 1. These tables are represented as functions blocks (101, 102). As will be explained below, appropriate functions using these tables are performed by the processor of the image printing device.

As shown in FIG. 1, an image data signal (105) is input to the image printing device. A port, jack or other wired connection or wireless transceiver may serve as the means by which the image data signal is received by the image printing device. The image data signal (105) represents a continuous tone image described in terms of gray scale or absorptance (b). This signal includes four to eight bits of data (1A) for each pixel describing the gray-scale of the pixel. This data is processed through the density function D(b) (101) and the $\theta$(b) or dot size function (102). As mentioned above, these functions are based on, and make use of, the tables described above which are empirically generated during the engineering of the image printing device.

Based on the gray-scale or absorptance data (b), the density function (1011 outputs a density map (110) defining the density of the dots to be printed. The density map (110)

is eight bits of data per pixel and is processed by an error diffusion algorithm (103), of a kind known in the art.

The error diffusion algorithm (103) uses the density map (110) to generate a dot-placement image signal (106). The dot-placement signal (106) is a binary image consisting of 0s and 1s. Each one (1) indicates the location on the print medium where a dot is to be printed. Consequently, the dot-placement signal (106) includes one bit per pixel specifying the presence or absence of a dot.

The θ(b) function (102), similarly, extracts the gray-scale data (b) of the continuous tone image signal (105) to output a dot size map (111) that specifies, and is used to modulate, the size of each dot. The dot size map (111) requires eight bits of data per pixel to specify the width and justification of each dot. Consequently, at point (1B) in the processing, each pixel is described by 16 bits of data (eight dot density bits from the D(b) function (101) plus eight dot-size bits from the θ(b) function (102)). Then, after the error diffusion algorithm (103) has been executed, at point (1C) in the processing, each pixel is described by nine bits of data (eight dot size data bits (111)+one dot placement bit (106)).

A dot size modulation algorithm (104) combines the dot-placement map (106) with the dot size map (111) so that a dot size is appropriately paired with each dot designated for printing by the dot-placement map (106). The result is a half-tone image data signal (107) that can be used to drive the print head or laser of the image printing device. The half-tone image data signal (107) includes four to eight bits of data per pixel. Note that some systems allow fewer than eight bits of dot size/justification data.

The present invention also encompasses a method for reducing the data required for each pixel during a particular phase of this processing of data for an AM/FM image. Under the principles of the present invention, the data required to describe the image is reduced to one bit per pixel following execution of the error diffusion algorithm (103), thereby achieving a compression factor of nine as compared with the method illustrated in FIG. 1.

As will be described in detail below, with the improved method of the present invention, the data specifying dot size provided by execution of the θ(b) function (102) (eight bits per pixel) is omitted from the data signal (106; 2B in FIG. 2) following execution of the error diffusion algorithm (103). Thus, at this point in the processing (2B), the image is completely and accurately described by only one bit per pixel. The size of each dot is then inferred from the context (density pattern) within which that dot occurs. This requires only that the number of dots that occur in a square, M×M window of pixels centered at the current dot location be counted. A typical value for M would be, for example, 5, thereby describing a 5×5 block of pixels centered at the current dot location.

Figure 2:
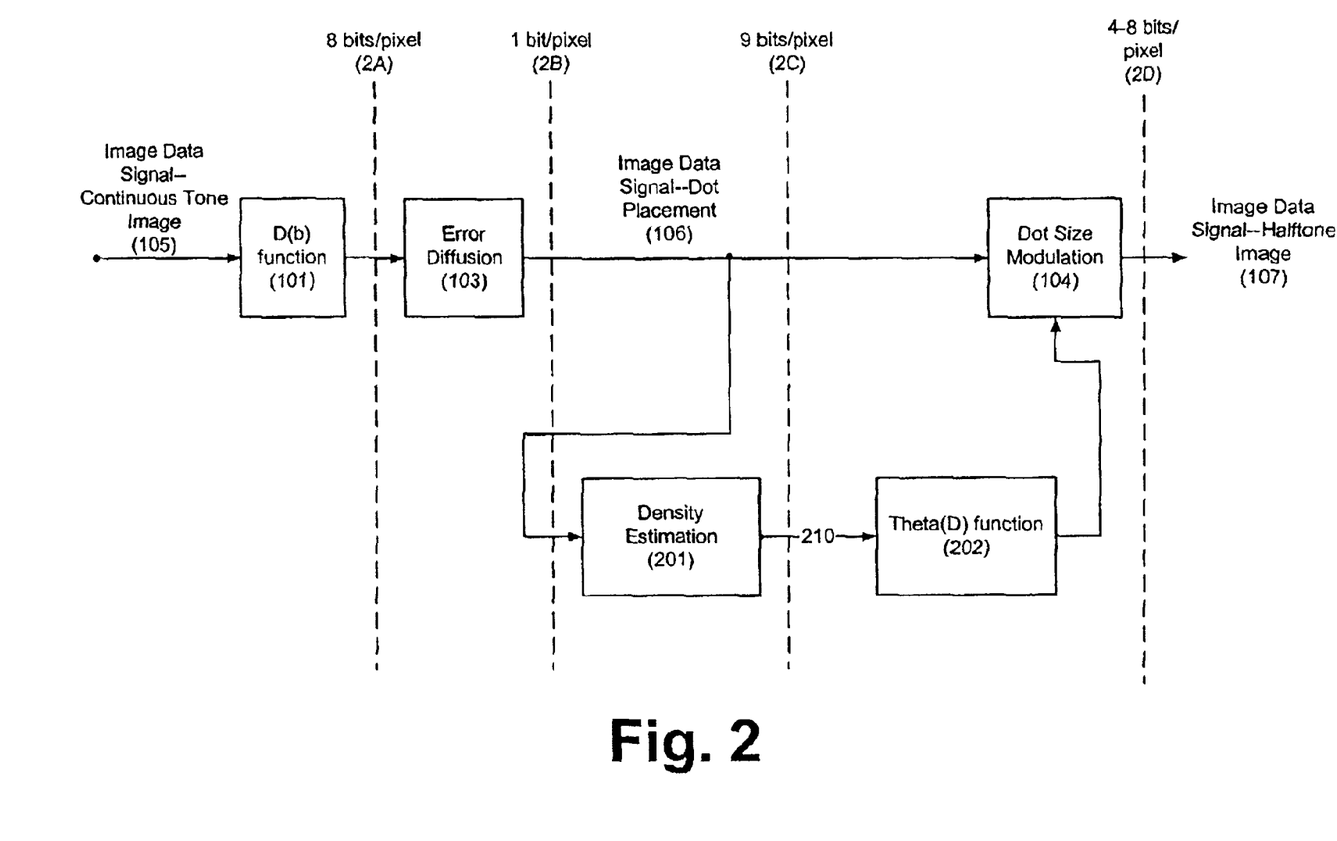
FIG. 2 is a functional block diagram illustrating an improved processing of a continuous tone image signal in an improved image printing device according to one embodiment of the present invention.

As shown in FIG. 2, the continuous-tone image data signal (105) which describes the image, pixel by pixel, in terms of gray-scale or absorptance (b), is fed to the density function (101). As before, the density function (101) outputs a density map defining the density of the dots to be printed. The density map (110) has eight bits of data per pixel (2A) and is subsequently processed by the error diffusion algorithm (103), of a kind known in the art.

The error diffusion algorithm (103) uses the density map output by the D(b) function (101) to create a dot placement data signal (106). This dot placement data signal or map (106) is a binary image consisting of 0 s and 1 s. Each binary one (1) indicates the location on the print medium where a dot is to be printed or a location on a print drum which is to be exposed to a laser to cause toner to adhere thereto when applied. Each binary zero (0) indicates the absence of such a dot.

At this point in the processing (2B), the image data signal has been compressed to one bit per pixel in the dot placement map (106). Consequently, as will be described later, the dot placement map (106) can be used to transmit or storage the digital representation of the image to be printed with maximum efficiency since each pixel is represented by a single bit.

Next, the dot placement map (106) is provided to a density estimation function (201). The density estimation function (201) examines the density of dots in an defined area around each individual dot in the image to estimate a dot density factor specific to that central dot. From the density of the surrounding dots, the proper size of each dot can be inferred.

Figure 3:
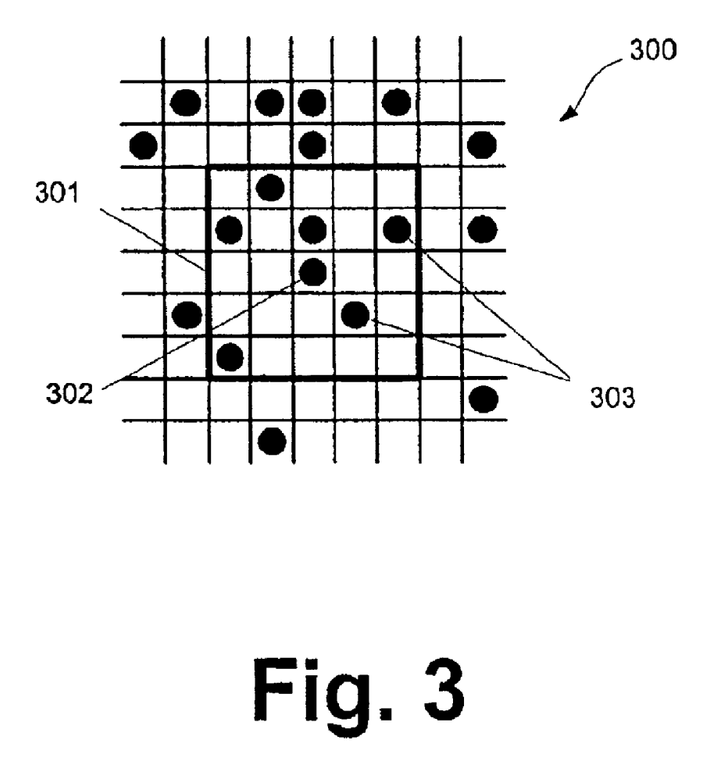
FIG. 3 illustrates a portion of a dot-matrix being printed for which dot size is determined based on dot density without dot size information being encoded in the image data stream.

This principle is illustrated in FIG. 3. As shown in FIG. 3, the density estimation function (201; FIG. 2) focuses on a square matrix (301) of pixels within a portion (300) of the dot placement map (1061. The square matrix (301) is centered on a dot (302) for which dot size is being determined. The density estimation function (201) counts all the dots (e.g. 303) within the matrix (301) to provide an estimation of the density of dots in the vicinity (300) of the dot (302) for which dot size is to be determined.

In choosing the size of the square matrix (301) or window around the dot (302) for which dot size is to be determined, there is a tradeoff between amplitude resolution and spatial resolution. A larger window will yield high resolution in amplitude, but spatial variations in density will be smoothed. In light of these considerations, the square matrix (301) (M×M), which is centered on the dot (302) for which dot size is being determined and within which dots (303) are counted to estimate local density, is preferably 5 dot positions to a side, i.e. M=5, as shown in FIG. 3.

The number of dots counted in the square matrix (301) centered on the dot (302) for which dot size is to be determined is N. In the example of FIG. 3, N=7. The central dot (302) is preferably included in the count. The estimated density (D) is given by D=1/N. Thus, in the example of FIG. 3, estimated density D=1/7=0.143.

After determining the density of dots being printed in the vicinity of the dot (302) for which size is to be determined, the appropriate size of that dot (302) can be calculated as a function of estimated density. This is done using the data from the two tables empirically created by the method described above. As noted above, a preferred value of dot size (θ) and density (D) is chosen for each gray-scale or absorptance value (b) of a continuous tone image data signal. This selection is based, as described above, on minimization of visual noise in the printed image. Consequently, the θ(b) and D(b) functions (102, 101) map each value of gray-scale (b) in a continuous tone image to the selected optimal values of dot-size (θ) and density (D). Consequently, given dot size as a function of gray-scale, i.e., θ(b), and density as a function of gray 20 scale, i.e., D(b), we can readily map dot size as a function of density, i.e., θ(D). In other words, each gray-scale value is mapped to a specific dot-size (θ) and density (D) combination. Thus, for each density (D) value there is a corresponding specific dot-size (θ) value. Therefore, given a density value from the density estimation function (201), we can obtain a specified dot size value (θ) that corresponds to that density value (D). The relationship between dot size (θ) and density (D) need not be one-to-one, but each density (D) must be associated with only one dot size (θ) value.

Returning to FIG. 2, the density estimation operation (201) is performed for each dot in the image. In other words, the square window (301) is moved or scanned throughout the dot placement map (106) and a density estimation is performed as described above for each dot in the map (106). Thus, the density estimation function (201) outputs an estimated density value (D) for each dot in the image. This estimated density value (210) is considered the appropriate density factor (D) for the dot in question and is passed to the θ(D) function (202) which determines the appropriate size of each dot based on that density (D) as described above. Prior to execution of the θ(D) function (202), the image data signal includes nine bits per pixel (2C) (one bit per pixel in the dot placement map (106) plus eight bits per pixel from the density estimation function (210). The θ(D) function (202) then outputs a dot size map that is to be used to modulate the size of each dot.

The dot size modulation algorithm (104) receives the dot size map from the θ(D) function (202) and combines the dot placement map (106) with the dot size map so that a dot size is appropriately paired with each dot designated for printing by the density map. The result is a half-tone image data signal (107) that can be used to drive the print head or laser of the image printing device. The half-tone image data signal (107) contains four to eight bits of data per pixel (2D).

The density estimation can be done efficiently in a raster scan manner by using column buffers. When implemented in this manner, only 5 additions are required per pixel, independent of the size of the window (M×M). It may also be desirable to apply a weighting to the pixels counted in the window (M×M). This weighting should take on its maximum value at the center of the window, and roll off smoothly to the edge of the window. This forces the density estimate to vary smoothly, as dots enter and leave the window, while the density estimation function (201) scans across the dot placement map (106) of the image generating a specified dot size for each dot.

Figure 2A:
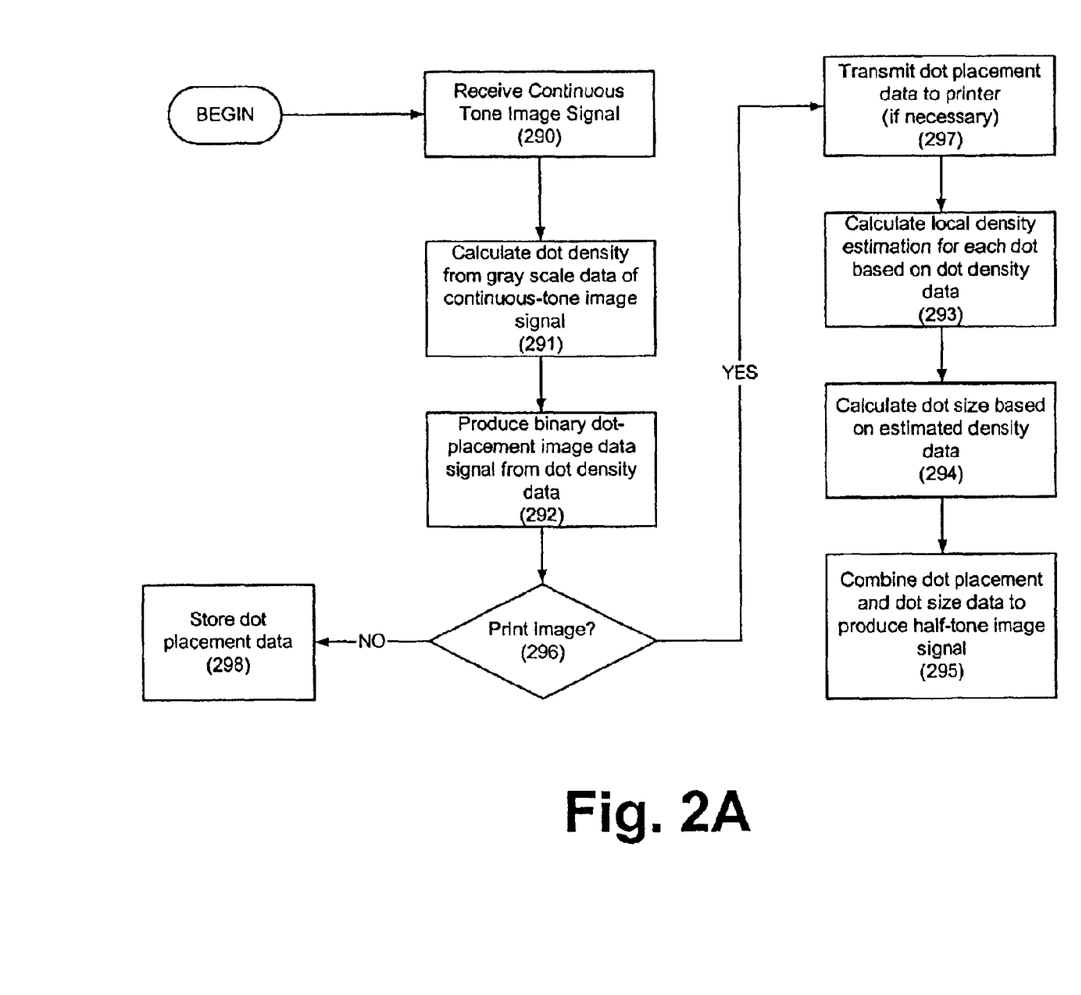
FIG. 2A is a flowchart illustrating the method of the functional block diagram of FIG. 2.

FIG. 2A provides a flowchart overview of the functional process described above. As shown in FIG. 2A, the system of the present invention first receives a continuous tone image signal (290). The system then calculates dot density data from the gray scale data of the continuous tone image (291). The dot density data is then used to generate the binary dot placement map (292).

At this point, the image data signal contains only one bit per pixel and is, therefore, compressed and very easy to store or transmit. Consequently, it may be optimal to perform the first three steps (290 to 292) on a host computer and transmit the image data signal to an attached image printing device after production of the dot-placement map has compressed the data stream down to one bit per pixel. Alternatively, all the steps of the method of FIG. 2A can be performed in the image printing device.

If the image is to be printed immediately (296), the dot placement map is transmitted (297) to the image printing device, if necessary. If printing is not to be performed at that time, the dot placement map may be stored (298) for later printing. In this way, the required storage space is minimized because of the compressed, one-bit-per-pixel nature of the dot placement map.

If printing is being performed, local density is estimated for each dot in the dot-placement map (293). From this density estimation, dot size for each dot in the dot-placement map is determined in the manner described above (294). The dot placement map and the dot size map are then combined to generate a half-tone image signal that can be used by the printing device to print the described image (295).

Figure 2B:
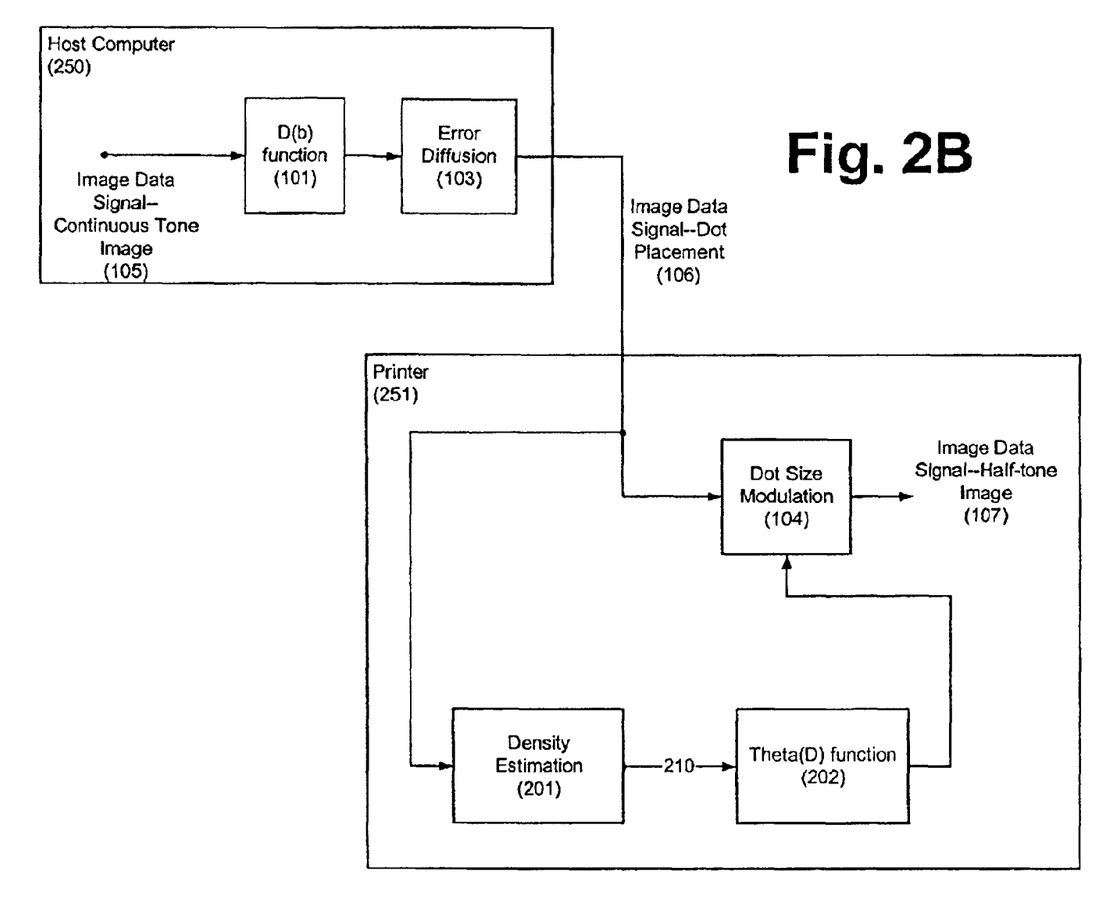
FIG. 2B is a functional block diagram of an embodiment of the present invention in which the processing functions are divided among a host computer and printer to provide more efficient communication of data between the two devices.

FIG. 2B illustrates an embodiment of the present invention in which transmission of the image data signal to the image printing device occurs when the data is compressed as a dot-placement map (106) with one bit per pixel. This allows the absolute minimum of data to be transmitted between a host computer (250) and the image printing device, e.g., a printer (251).

A shown in FIG. 2B, the continuous tone image signal (105) is processed by the host computer (250) running the density function (101) and the error diffusion function (103). The resulting dot placement map (106) is then stored or transmitted to the printer (251). The printer performs the density estimation function (201) and θ(D) function (202) to generate a dot-size map that is combined with the dot placement map by the dot size modulation function (104) to generate the half-tone image signal (107) used to drive the printer (251).

Figure 4:
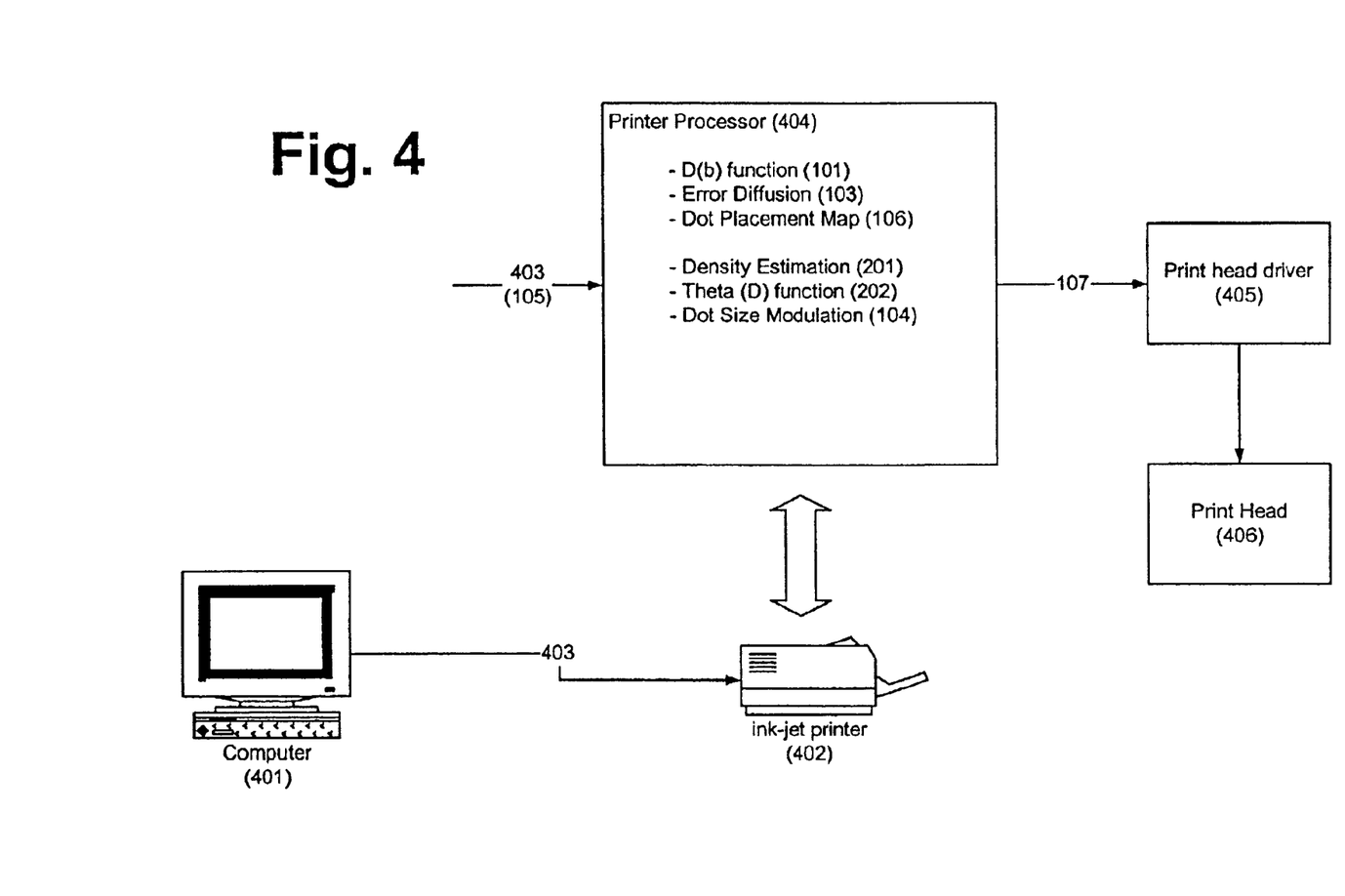
FIG. 4 illustrates one embodiment of the present invention implemented in an ink-jet printer.

FIG. 4 illustrates the principles of the present invention implemented in an ink-jet printer. As shown in FIG. 4, the continuous tone image signal (105) may be output by computer equipment (401) (including, for example, a computer or scanner). The image signal (105) is transmitted over a connection (403), e.g., a local-area-network or printer cable, to the ink-jet printer (402). The signal (105) is received by the processor (404) within the printer. The processor then performs the various functions and algorithms described above on the image data signal (105).

Specifically, the processor (404) executes the D(b) (101) and error diffusion (103) functions to generate a dot placement map (106). The dot placement map (106) is then used as input as the processor (404) executes the density estimation function (201) and θ(D) function (202) to generate a dot size modulation map which is combined with the density map (106) by the dot size modulation function (104) to produce the half-tone image signal (107).

The half-tone image signal (107) can then be output to the print head driver (405) of the ink-jet printer (402). The print head driver (405) then drives the print head (406) to print the image on the print medium.

Figure 4A:
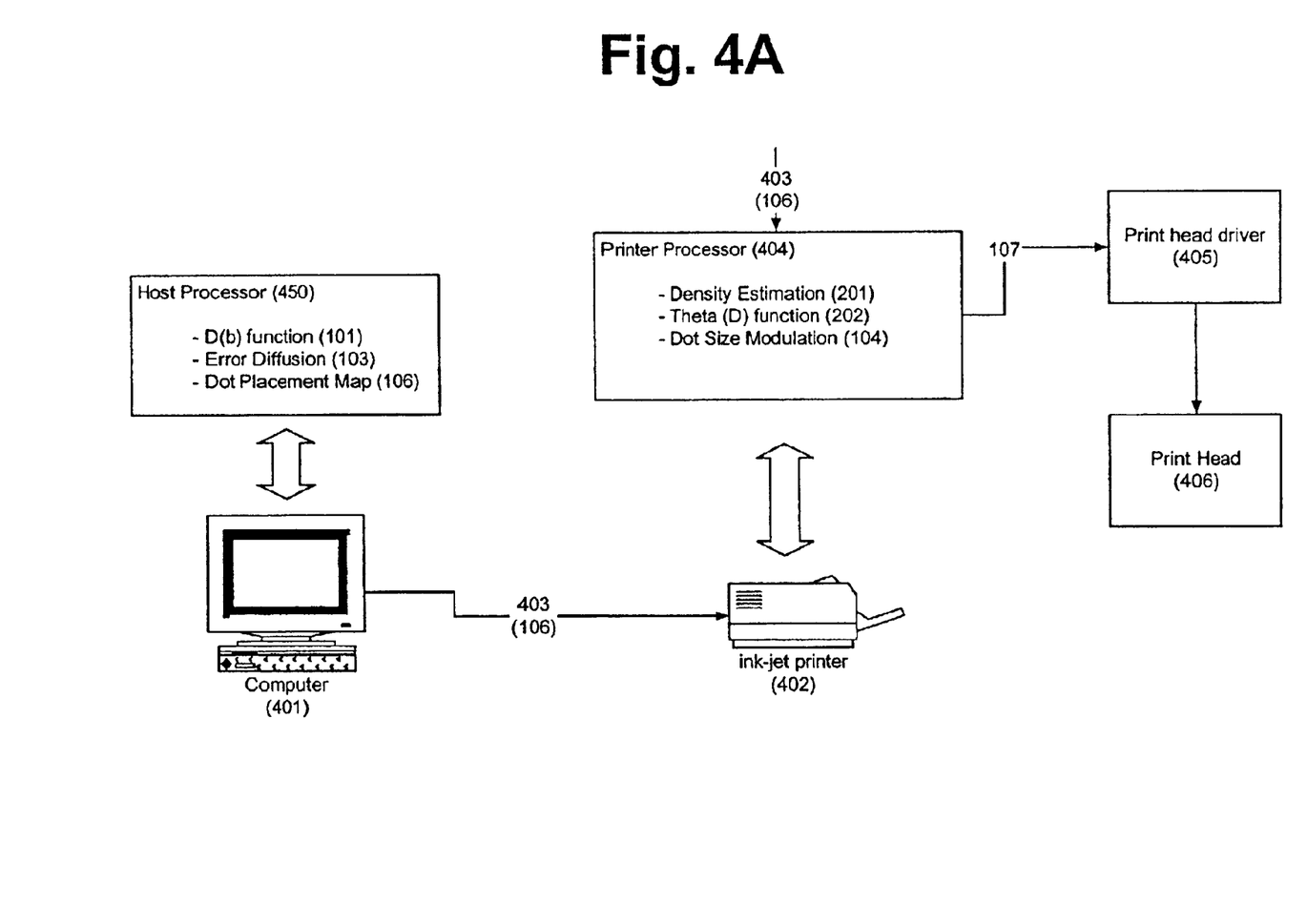
FIG. 4A illustrates a alternate embodiment of the present invention implemented in an ink-jet printer.

FIG. 4A illustrates a second implementation of the present invention in an ink-jet printer. In the example of FIG. 4A, the generation of the dot placement map (106) is performed by the computer equipment (401). The dot placement map (106) is then transmitted to the ink-jet printer (402) over the connection (403). Because the dot placement map is only one bit per pixel, this data transfer is optimized. The remaining processing is then performed by the printer processor (404) as described above.

Figure 5:
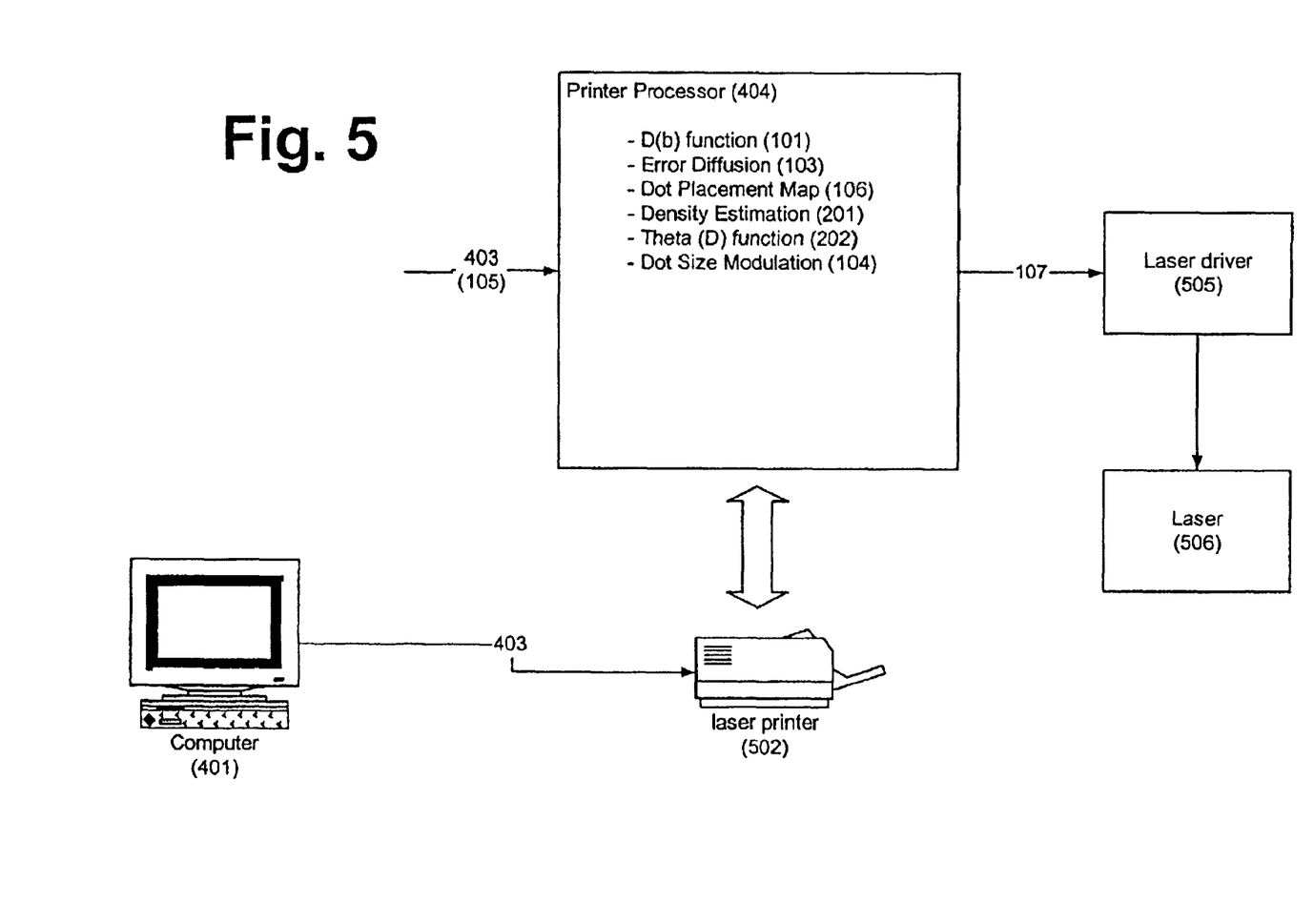
FIG. 5 illustrates one embodiment of the present invention implemented in a laser printer.

FIG. 5 illustrates the principles of the present invention implemented in an laser printer. As in FIG. 4, the continuous tone image signal (105) may be output by computer equipment (401) (including, for example, a computer or scanner). The image signal (105) is transmitted over a connection (403), e.g., a local-area-network or printer cable, to the laser printer (502). The signal (105) is received by the processor (404) within the printer. The processor (404) then performs the various functions and algorithms described above on the image data signal (105). Specifically, the processor (404) executes the D(b) (101) and error diffusion (103) functions to generate a dot placement map (106). The dot placement map (106) is then used as input as the processor (404) executes the density estimation function (201) and θ(D) function (202) to generate a dot size modulation map which is combined with the dot placement map (106) by the dot size modulation function (104) to produce the half-tone image signal (107).

The half-tone image signal (107) can then be output to the laser driver (505) of the laser printer (502). The laser driver (505) then drives the laser (506) to selectively illuminate a print drum such that toner will adhere and print to the print medium from those illuminated portions of the drum.

Figure 5A:
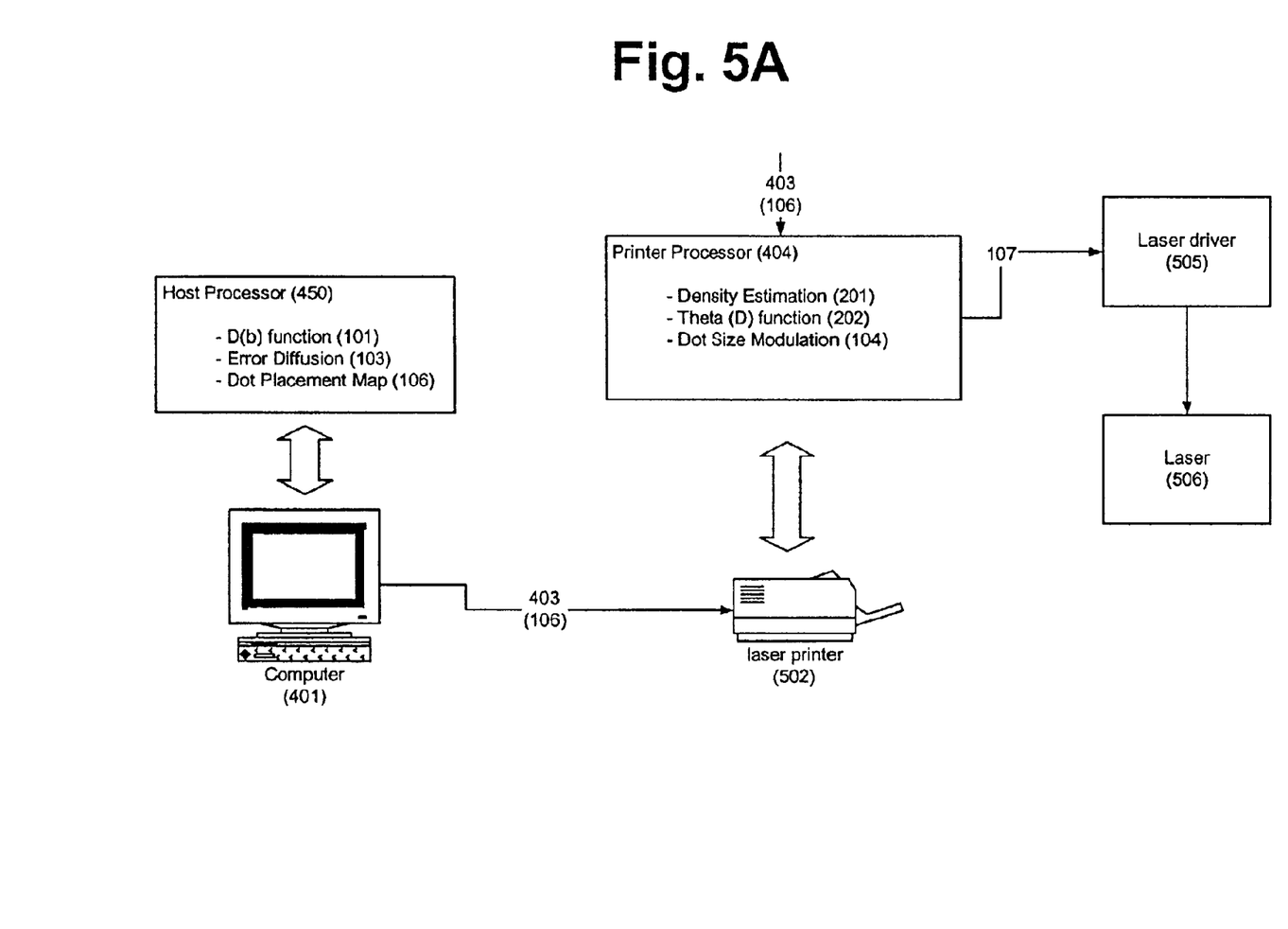
FIG. 5A illustrates an alternate embodiment of the present invention implemented in an laser printer.

FIG. 5A illustrates a second implementation of the present invention in an laser printer. In the example of FIG. 5A, the generation of the dot placement map (106) is performed by the computer equipment (401). The dot placement map (106) is then transmitted to the laser printer (502) over the connection (403). Because the dot placement map is only one bit per pixel, this data transfer is optimized. The remaining processing is then performed by the printer processor (404) as described above.

Figure 6:
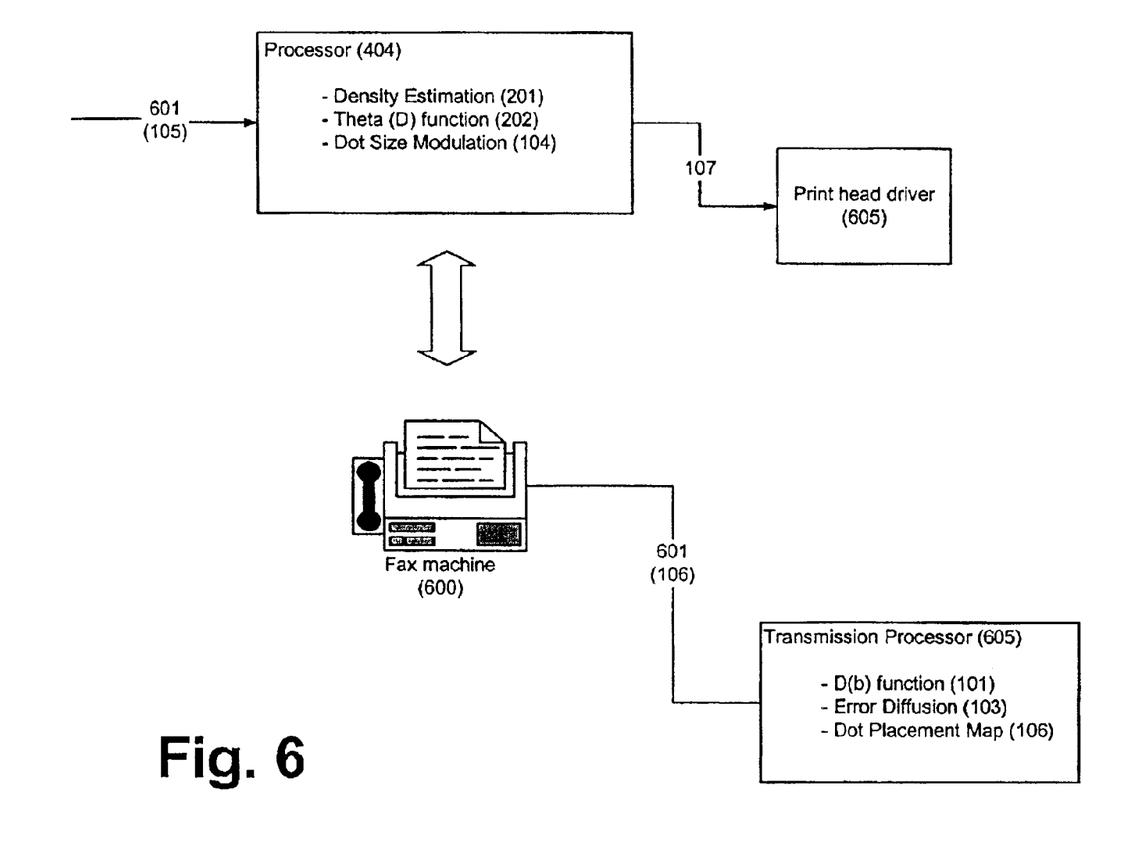
FIG. 6 illustrates one embodiment of the present invention implemented in a fax machine or other copier receiving an image data stream.

Finally, FIG. 6 illustrates the principles of the present invention implemented in a fax machine (600). As will be understood by those skilled in the art, the fax machine (600) could be equivalently replaced with any other copier device that creates an image copy based on an image data signal.

As shown in FIG. 6, a continuous tone image signal is processed by a transmission processor (605). The transmission processor (605) performs the D(b) function (101) and the error diffusion function (103) to generate a dot placement map (106). The dot placement map (106) may be communicated to the fax machine (600) over a telephone line (601). This is particularly advantageous because the dot placement map (106) as described above requires only one bit per pixel. Consequently, the time required to transmit the data to the fax machine (600) is minimized. This is particularly advantageous if the phone call to the fax machine is long distance and incurs costs based on transmission time.

The image signal, i.e., the dot placement map (106), is received by the processor (604) within the fax machine (600). The processor (604) then performs the various functions and algorithms described above on the image data signal (105). Specifically, the processor (604) executes the density estimation function (201) and θ(D) function (202) to generate a dot size modulation map which is combined with the dot placement map (106) by the dot size modulation function (104) to produce the half-tone image signal (107).

The half-tone image signal (107) can then be output to the print head driver (605) of the fax machine. The print head driver (605) then drives the print head to print the image on the print medium. The fax machine print head may be, for example, ink-jet or laser, or some other print head.

Finally, the present invention also encompasses software or computer-readable instructions which can be used to cause a processing device to accomplish the method of generating dot size data based on dot placement and estimated dot density data. In this regard, computer-readable instructions include, but are not limited to, software, such as object or source code, written in any language, as well as firmware. The processing device or processor means receiving the instructions may be, but is not limited to, a host computer, a microprocessor (in a computer or printing device), an ASIC (in a computer or printing device) or firmware.

The computer-readable instructions of the present invention cause a processing device, that receives an image data signal comprising data specifying print location data for each dot that constitutes an image, to determine a size for each said dot based on said print location data of said image data signal. The computer readable instructions further cause the processing device to: (1) determine a density of dots around that dot for which size is being determined; and (2) determine the size for that dot based on that density.

Using the specific example given above, the instructions may cause the processing device to: (1) count a number of dots specified by the print location data for printing in a square matrix centered on a particular dot for which dot size is to be determined; and (2) calculate a dot density estimation based on the number of dots in the square matrix. The size for that particular dot is then determined based on the calculated dot density.

In summary, with the computer-readable instructions of the invention, the processor device becomes the means by which all the steps of the method of the present invention are accomplished.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An image printing device comprising:
   an input for receiving an image data signal in said image printing device; and
   a processor in said image printing device for receiving and processing said image data signal;
   wherein
   at a certain stage of the processing said image data signal contains one bit per pixel data specifying location data for each dot of which an image described by said image data signal is constituted but not a size for each said dot, and
   said processor estimates a dot density in a defined area around each said dot, and determines a size for each said dot based on the estimated dot density for that said dot.

2. The image printing device of claim 1, wherein said printing device prints said image using said location data in said image data signal and dot size data determined by said processor.

3. The image printing device of claim 1, wherein said printing device is a laser printer.

4. An image printing device comprising:
   an input for receiving an image data signal in said image printing device;
   and
   a processor in said image printing device for receiving and processing said image data signal;
   wherein
   said image data signal contains data specifying location data for each dot of which an image described by said image data signal is constituted, said processor determines a size for each said dot based on dot density data derived from said location data of said image data signal, said processor is programmed to count a number of dots specified by said location data for printing in a square matrix centered on a particular dot for which dot, wherein size is to be determined and to calculate a dot density estimation based on said number of dots in said square matrix; and wherein said square matrix has five pixels to a side.

5. An image printing device comprising:
an input for receiving an image data signal in said image printing device; and
a processor in said image printing device for receiving and processing said image data signal;
wherein
said image data signal contains data specifying location data for each dot of which an image described by said image data signal is constituted, said processor determines a size for each said dot based on dot density data derived from said location data of said image data signal, and said processor is programmed to count a number of dots specified by said location data for printing in a square matrix centered on a particular dot for which dot,
wherein size is to be determined and to calculate a dot density estimation based on said number of dots in said square matrix, and wherein said processor, in calculating said dot density, weights each counted dot based on proximity to a center of said square matrix.

6. The method of claim 1, wherein the defined area has a predetermined size that is the same for each said dot.

7. An image printing device comprising:
an input for receiving an image data signal in said image printing device; and a processor in said image printing device for receiving and processing said image data signal;
wherein
said image data signal contains data specifying location data for each dot of which an image described by said image data signal is constituted,
said processor determines a size for each said dot based on dot density data derived from said location data of said image data signal, and
said processor is programmed to count a number of dots specified by said location data for printing in a square matrix centered on a particular dot for which dot size is to be determined and to calculate a dot density estimation based on said number of dots in said square matrix.

8. The image printing device of claim 7, wherein a dot size of said particular dot is determined based on said dot density estimation.

9. The image printing device of claim 7, wherein said square matrix has five pixels to a side.

10. The image printing device of claim 7, wherein said processor, in calculating said dot density, weights each counted dot based on proximity to a center of said square matrix.

11. A method of printing an image with an image printing device based on a one bit per pixel image data signal that comprises data specifying print location data for each dot that constitutes said image but not a size for each said dot, said method comprising:
estimating a dot density in a defined area around each said dot, and
determining a size for each said dot based on the estimated dot density for that said dot.

12. The method of claim 11, wherein said determining a size for each said dot further comprises, determining a density of dots around that dot for which size is being determined and determining said size for that dot based on said density.

13. The method of claim 11, further comprising printing said image with said printing device using said location data in said image data signal and dot size data.

14. A method of printing an image with an image printing device based on an image data signal that comprise data specifying print location data for each dot that constitutes said image, said method comprising
determining a size for each said dot based on said print location data of said image data signal, the detemining including counting a number of dots specified by said print location data for printing in a square matrix centered on a particular dot for which dot size is to be determined;
calculating a dot density estimation based on said number of dots in said square matrix; and
defining said square matrix as having five pixels to a side.

15. A method of printing an image with an image printing device based on an image data signal that comprise data specifying print location data for each dot that constitutes said image, said method comprising
determining a size for each said dot based on said print location data of said image data signal, the determining including counting a number of dots specified by said print location data for printing in a square matrix centered on a particular dot for which dot size is to be determined;
calculating a dot density estimation based on said number of dots in said square matrix;
and
wherein said calculating a dot density estimation further comprises weighting each counted dot based on proximity to a center of said square matrix.

16. The method of claim 15, wherein the one bit per pixel image data signal is generated by the image printing device from the continuous-tone image data signal.

17. The method of claim 15; further comprising:
processing the continuous-tone image data signal to form a multiple bits per pixel image data signal that defines a density of the dots that constitute said image; and
error-diffusing the multiple bits per pixel image data signal to form the one bit per pixel image data signal.

18. The method of claim 17, wherein the processing and the error-diffusing are performed by an external device coupled to the image printing device.

19. The method of claim 17, wherein the processing and the error-diffusing are performed by the image printing device.

20. The method of claim 17, wherein the multiple bits per pixel image data signal is an eight bits per pixel image data signal.

21. The method of claim 11, wherein the defined area has a predetermined size that is the same for each said dot.

22. A method of printing an image with an image printing device based on an image data signal that comprises data specifying print location data for each dot that constitutes said image, said method comprising determining a size for each said dot based on said print location data of said image data sigal, the determining including:
counting a number of dots specified by said print location data for printing in a square matrix centered on a particular dot for which dot size is to be determined; and
calculating a dot density estimation based on said number of dots in said square matrix.

23. The method of claim 22, further comprising determining a dot size of said particular dot is based on said dot density estimation.

24. The method of claim 22, further comprising defining said square matrix as having five pixels to a side.

25. The method of claim 22, wherein said calculating a dot density estimation further comprises weighting each counted dot based on proximity to a center of said square matrix.

26. An image printing device comprising:
means for receiving an image data signal in said image printing device; and
processor means in said image printing device for receiving and processing said image data signal, wherein at a certain state of the processing said image data signal contains one bit per pixel data specifying location data for each dot of which an image described by said image data signal is constituted but not a size for each said dot, said processor means comprising means for estimating a dot density in a defined area around each said dot, and means for determining a size for each said dot based on the estimated dot density for that said dot.

27. An image printing device comprising:
means for receiving an image data signal in said image printing device; and
processor means in said image printing device for receiving and processing said image data signal, wherein said image data signal contains data specifying location data for each dot of which an image described by said image data signal is constituted, said processor means comprising
means for determining a size for each said dot based on dot density data derived from said location data of said image data signal,
means for counting a number of dots specified by said location data for printing in a square matrix centered on a particular dot for which dot size is to be determined, and
means for calculating a dot density estimation based on said number of dots in said square matrix.

28. The image printing device of claim 27, wherein a dot size of said particular dot is determined based on said dot density estimation.

29. Computer-readable instructions stored on a media for recording computer-readable instructions, wherein said instructions cause a processing device, that processes a one bit per pixel image data signal comprising data specifying print location data for each dot that constitutes an image but not a size for each said dot, to estimate a dot density in a defined area around each said dot, and determine a size for each said dot based on the estimated dot density for that said dot.

30. The computer readable instructions of claim 29, wherein said instructions further cause said processing device to:
determine a density of dots around that dot for which size is being determined; and
determine said size for that dot based on said density.

31. Computer-readable instructions stored on a media for recording computer-readable instructions, wherein said instructions cause a processing device, that receives an image data signal comprising data specifying print location data for each dot that constitutes an image, to determine a size for each said dot based on said print location data of said image data signal by
counting a number of dots specified by said print location data for printing in a square matrix centered on a particular dot for which dot size is to be determined; and
calculating a dot density estimation based on said number of dots in said square matrix;
wherein said size for that particular dot is determined based on said calculated dot density.

* * * * *